United States Patent
Yokoyama et al.

(10) Patent No.: US 8,459,547 B2
(45) Date of Patent: Jun. 11, 2013

(54) CONTROL DEVICE AND USE CONTROL METHOD FOR CONTROL OBJECT APPARATUS

(75) Inventors: Takayuki Yokoyama, Machida (JP); Kazuyoshi Tanaka, Hachioji (JP); Yutaka Tourai, Funabashi (JP); Ryouichi Suzuki, Funabashi (JP); Tomoko Yamashita, Ayase (JP)

(73) Assignee: Konica Minolta Business Technologies, Inc. (JP)

( * ) Notice: Subject to any disclaimer, the term of this patent is extended or adjusted under 35 U.S.C. 154(b) by 293 days.

(21) Appl. No.: 12/731,476

(22) Filed: Mar. 25, 2010

(65) Prior Publication Data

US 2010/0243735 A1    Sep. 30, 2010

(30) Foreign Application Priority Data

Mar. 30, 2009   (JP) ................................ 2009-082110

(51) Int. Cl.
*G06K 5/00*   (2006.01)

(52) U.S. Cl.
USPC .......................................... 235/380; 235/382

(58) Field of Classification Search
USPC ................................................ 235/380, 382
See application file for complete search history.

(56) References Cited

U.S. PATENT DOCUMENTS

| | | | | |
|---|---|---|---|---|
| 4,480,181 A | * | 10/1984 | Fisher | 235/486 |
| 6,196,460 B1 | * | 3/2001 | Shin | 235/380 |
| 6,598,792 B1 | * | 7/2003 | Michot et al. | 235/384 |
| 6,917,440 B2 | * | 7/2005 | Kondo et al. | 358/1.15 |
| 7,506,814 B2 | * | 3/2009 | Nakabo et al. | 235/451 |
| RE43,778 E | * | 10/2012 | Nimura et al. | 358/1.15 |
| 2003/0149510 A1 | * | 8/2003 | Takahashi | 700/237 |

FOREIGN PATENT DOCUMENTS

| | | |
|---|---|---|
| JP | 2001-307183 A | 11/2001 |
| JP | 2005-190291 A | 7/2005 |
| JP | 2005-284326 A | 10/2005 |
| JP | 2006-312270 A | 11/2006 |

OTHER PUBLICATIONS

Notice of Reasons for Refusal for Japanese Patent Application No. 2009-082110, mailed Nov. 27, 2012, with English translation.

\* cited by examiner

*Primary Examiner* — Christle Marshall
(74) *Attorney, Agent, or Firm* — Cantor Colburn LLP

(57) ABSTRACT

A control device for controlling a use of control object apparatus, including a control section which is configured to read out information recorded in an IC card with noncontact state, to discriminates an attribute of a user based on readout information and previously stored information, and to switch between an authentication mode and a billing mode in accordance with the attribute of the user, wherein in the authentication mode, the control section permits the use of the control object apparatus only with an authentication, and in the billing mode, the control section executes a billing processing on the IC card in accordance with a use state of the control object apparatus.

10 Claims, 10 Drawing Sheets

30: IC CARD xx UNIVERSITY EXCLUSIVE IC CARD 1111  2222  3333  4444
                MONTH / YEAR
VALIDATED DATE  01 / 15
KONICAMINOLTA TARO

→ PERSONAL INFORMATION

| SYSTEM CODE | 88 |
|---|---|
| CLASSIFICATION CODE | 1 |
| CLERK/STUDENT ID NUMBER | ******* |
| BELONGING CODE | ******* |
| NAME | ******* |
| BALANCE OF ELECTRONIC MONEY | ¥3250 |
| LATEST DATE OF USE | 2009/3/5 |
| ******* | ******* |
| ******* | ******* |

12: DISPLAY SECTION
14: SHIELDING SECTION
13: RECEIVING SECTION
15: STOPPER

14: SHIELDING SECTION
EXPOSED AREA

14: SHIELDING SECTION
13: RECEIVING SECTION
15: STOPPER

14: SHIELDING SECTION
EXPOSED AREA

14: SHIELDING SECTION
30: IC CARD

CONTROL DEVICE AND USE CONTROL METHOD FOR CONTROL OBJECT APPARATUS

CROSS REFERENCE TO RELATED APPLICATION

The present application is based on Japanese Patent Application No. 2009-082110 filed with Japanese Patent Office on Mar. 30, 2009, the entire content of which is hereby incorporated by reference.

BACKGROUND OF THE INVENTION

Technical Field

The present invention relates to a control device and a use control method for an object apparatus to be controlled, particularly to a control device provided with a reader function to read information recorded in an IC tag, and a use control method to control use of the control object apparatus based on said information recorded in the IC tag.

In recent years, RFID (Radio Frequency Identification) system is becoming popular which executes data communication between the IC tag and a reader by utilizing electromagnetic induction or electromagnetic coupling. Since RFID system can execute the data communication by using the IC tag and an antenna provided on each reader, the system is able to read the information recorded in the IC tag only by moving the IC tag closer to the reader. Due to such convenience, control of various kinds of devices becomes popular by the use of cards embedded with IC tags.

For example, there is a system where by connecting a control device having the above described reader function to an image forming apparatus having a copying function or a printing function, a billing function is executed according to the number of copied sheets or printed sheets. And, in the system, an electronic payment is executed by utilizing a credit card or an identification card (hereinafter referred as IC card) embedded with IC tag, or a mobile phone embedded with IC tag.

As a technology to improve the convenience of such RFID system, for example disclosed in Japanese Patent Application Publication No. 2005-284326 (Patent document 1) is a non-contact card handling device which is configured with a movable read/write module having an information read/write surface against a noncontact card, and enables reading/writing information against the noncontact card, both in states where the card is held by hand and the card is mechanically fixed.

Further, disclosed in Japanese Patent Application Publication No. 2005-190291 (Patent document 2) is a billing device where an IC card is placed in a receptacle and the cover is locked during the billing process, and after completion of the clearing associated with the copying service billing, the cover lock is released in order to prevent the cheating to elude the billing process.

As one type of configuration of RFID system including the image forming apparatus, there are cases where the image forming apparatus is installed in a facility such as a school, a library, or a town office, and both the working staffs of the facility and users (for example, visitors or students) of the facility are enabled to use the image forming apparatus.

In such the cases, the working staffs of the facility are considered to use the image forming apparatus in many cases with necessity for running the operation of the facility; therefore it is preferable to allow them to freely use the image forming apparatus without billing, only with authentication.

On the other hand, the users of the facility is considered to use the image forming apparatus for personal use in many cases, it is preferable to surely account at every use. However there has been a problem that use by both types of users cannot be administrated with one device, since conventional devices are not configured to realize both the functions of authentication and billing.

Further, in cases where read/write surface are configured to be exposed type as the case of Patent Document 1 in order to improve the convenience of operation in reading the IC card, a cheating to elude the billing may be enabled, for example, by taking away the IC card just before the billing process. According to this background, the Patent Document 2 proposed the system where the control device is provided with a cover to restrict taking out of IC card, the cover is closed after the IC card is installed, the image forming apparatus is operated, and after completion of the billing the cover opens to allow taking out the IC card.

However, since the RFID system is able to communicate with a condition that the IC tag is separated from the control device by several cm to several tens of cm, it may be possible to make the control device recognize that a legitimate IC card is installed by holding over the IC card from outside the cover. Therefore, the cheating cannot be prevented only by controlling the open/close of the cover.

Further, in cases where the cover is made of transparent resin member as described in the Patent Document 2, the IC card can be seen in the state of closing the cover, and personal information (such as name, card number) may be sneaked a look at by other user or passersby to cause a security problem.

On the other hand in cases where the cover is made of opaque member, the security problem can be prevented, however, since the IC card cannot be seen from outside with this structure, the user of image forming apparatus may forget the IC card loaded in the device and may forget to take out the IC card.

These problems may be caused similarly in the case of mobile phone loaded with an IC tag, not being limited to the IC card loaded with an IC tag. Further these problems may be caused similarly in cases of arbitral process requiring an authentication or a billing (for example, fare adjustment for a railway), not being limited to cases where copying or printing is done by the use of the image forming apparatus.

The present invention is performed in view of the above problems, and its major objective is to provide a control device and a use control method for a control object apparatus, which are able to properly execute both processes of an authentication and a billing.

Another objective of the present invention is to provide a control device and a use control method for a control object apparatus where billing process is surely executed and leak of personal information and forgetting of taking out the IC card are surely prevented.

SUMMARY

One aspect of the present invention to achieve the above objective is a control device for controlling a use of control object apparatus, is provided with a control section a control section which is configured to read out information recorded in an IC card with noncontact state, to discriminates an attribute of a user based on readout information and previously stored information, and to switch between an authentication mode and a billing mode in accordance with the attribute of the user, wherein in the authentication mode, the control section permits the use of the control object apparatus only with an authentication, and in the billing mode, the control section executes a billing processing on the IC card in accordance with a use state of the control object apparatus.

Another aspect of the present invention to achieve the above objective is a use control method for a control object apparatus provided in a system including at least the control object apparatus and a control device to control a use of control object apparatus, the use control method including: a first step of reading out information recorded in an IC card with noncontact state; and a second step of discriminating an attribute of a user based on the readout information and previously stored information, and switching between an authentication mode and a billing mode in accordance with the attribute of the user, wherein the authentication mode includes a step of permitting the usage of the control object apparatus only with an authentication; and the billing mode includes the step of executing a billing processing on the IC card in accordance with a use state of the control object apparatus.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Figure 1:
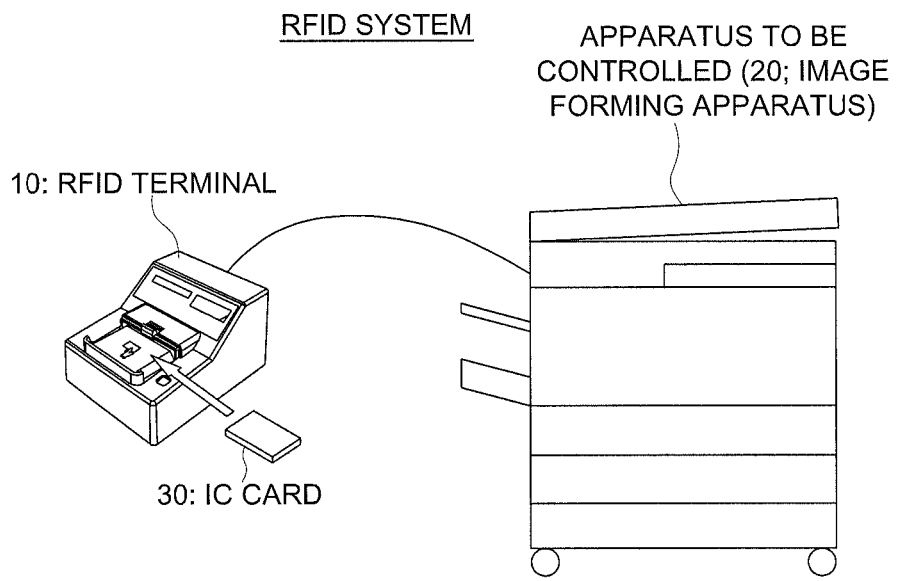
FIG. 1 is a diagram showing a configuration of a RFID system relating to an embodiment of the present invention.

In recent years, electronic money is rapidly becoming popular, and services to execute electronic payment by the use of IC card are provided. In cases where charging amount of money is clearly defined, such case as traffic service fare, the electronic payment is completed by taking the IC card close to the reader. However, in cases of service such as copying service or gas selling service where metered billing is adopted, since it requires a certain period of time to provide the service, a card lock system is needed to hold the IC card until the completion of the billing in order to prevent cheating activities.

Meanwhile, functions of the IC card has been installed not only in a cash card, but in identification cards such as a student identification card, a personnel identification card, and a company member identification card, and are utilized in various use such as copying service and printing service in addition to purchasing food tickets or goods from stores.

In cases of installing the function of IC card in the personal identification card, there may be differences in use form. For example, in cases of copying service or print service, a use form may be preferable where the personnel can freely use the services of copying or printing only by proving the identification, while students are subjected to billing according to services. In this case the personnel is only required to receive touch authentication while the card lock is required for a student, however, there has been a problem that conventional control device cannot properly carry on both the authentication and billing by a single device.

Further, regarding the billing function, there has been a device as described in Patent Document 2 where an IC card receiving section is shielded by a cover and open/close of the cover is interlocked with the billing processing, however there has been a problem that the cheating cannot be surely prevented by this system.

To be more specific, for example, at first a card insertion is made recognized by inserting a phony plastic card in the receptacle of the control device, after that, the control device is made recognize that a legitimate IC card is installed by holding the IC card over from outside the cover, and copying operation is executed, then if the legitimate IC card is took away from the control device, the control device cannot charge on the IC card.

In order to prevent such the cheating by a computer control, it may be possible by a method where the control device temporarily keeps all electronic money in the IC card, and after copying or printing is finished the residual money is returned to the IC card by subtracting the service charge. In this method, however, in a case of an electrical power failure at the time of keeping the electronic money in the IC card, it is necessary to return the kept money, therefore a human confirmation work may be needed, as well as the issuer of the IC card needs to provide a device which is able to write in the memory section of the IC card.

Further, in the case of shielding the IC card by a transparent cover, personal information on the IC card (such as a name, a card number) may be sneaked a look at by other person user to cause a security problem. And in cases where the cover is made of opaque member, the user may forget about taking out the IC card. Therefore, the structure of cover to restrict taking out of the IC card also needs devised improvement.

In the present embodiment, firstly, a control section of the control device discriminates an attribute of a user based on the readout information, and switches between an authentication mode and a billing, mode, to separately execute the authentication and the billing. Secondly, by making the structure of the shielding section for restricting the taking out of the IC card to block off the electromagnetic wave, the control device allows a use of a control object apparatus after confirming that the shielding section has been closed. And thirdly, by making the shielding section to be not completely closed or partially to be transparent, a partial portion of the IC card, outside the portion where the personal information is described, can be made visible.

Object apparatuses to be controlled by the control device are arbitrary, however, in the embodiment described bellow, the case is explained where the image forming apparatus is the control object apparatus.

Embodiment

Figure 2:
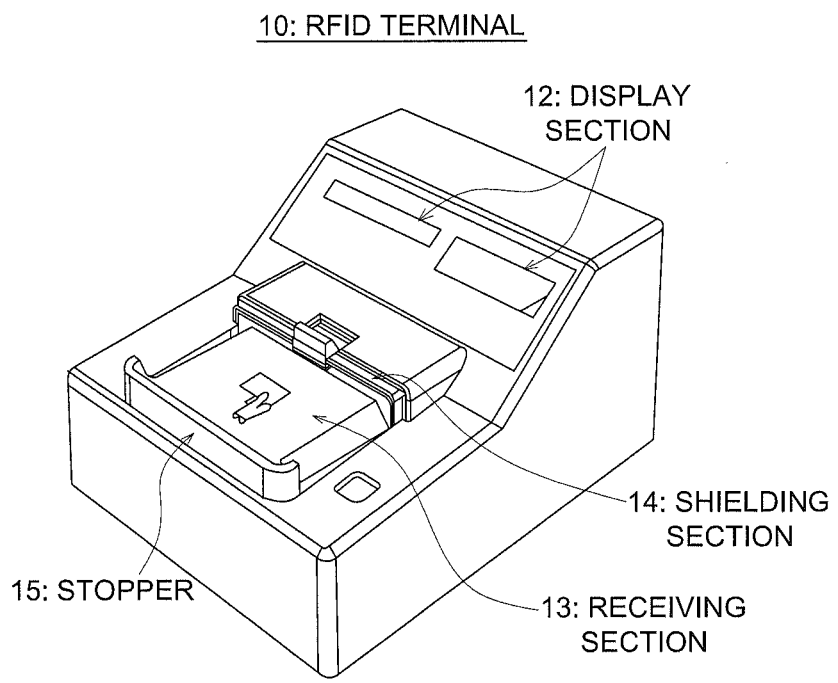
FIG. 2 is a diagram showing an example of external view of the control device relating to an embodiment of the present invention.
Figure 3:
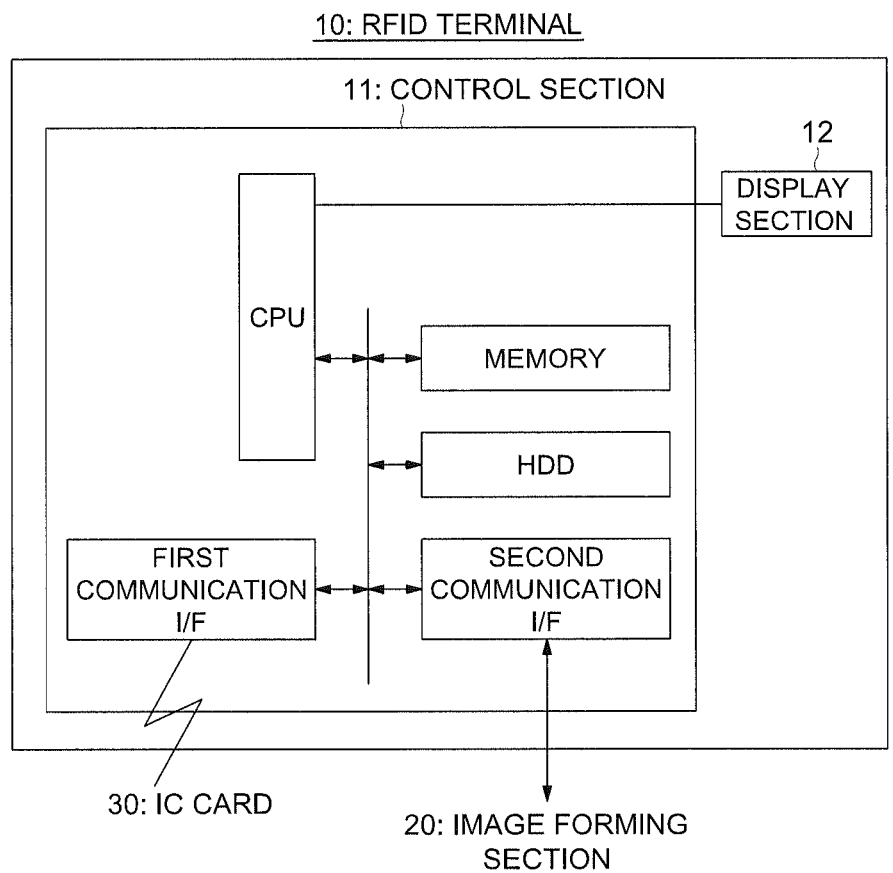
FIG. 3 is a block diagram showing a configuration of the control device relating to an embodiment of the present invention.
Figure 4:
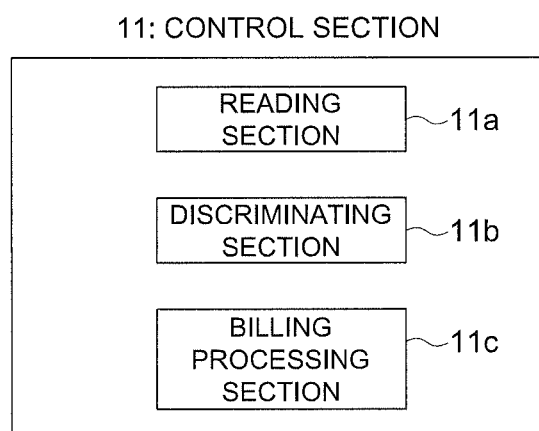
FIG. 4 is a block diagram showing a configuration of a control section of the control device relating to an embodiment of the present invention.
Figure 5:
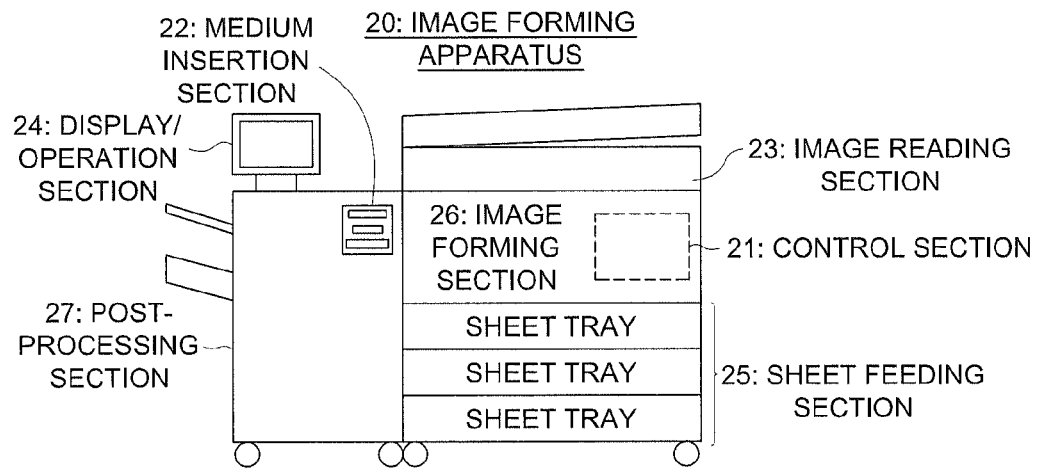
FIG. 5 is a diagram showing an example of external view of an image forming apparatus relating to an embodiment of the present invention.
Figure 6:
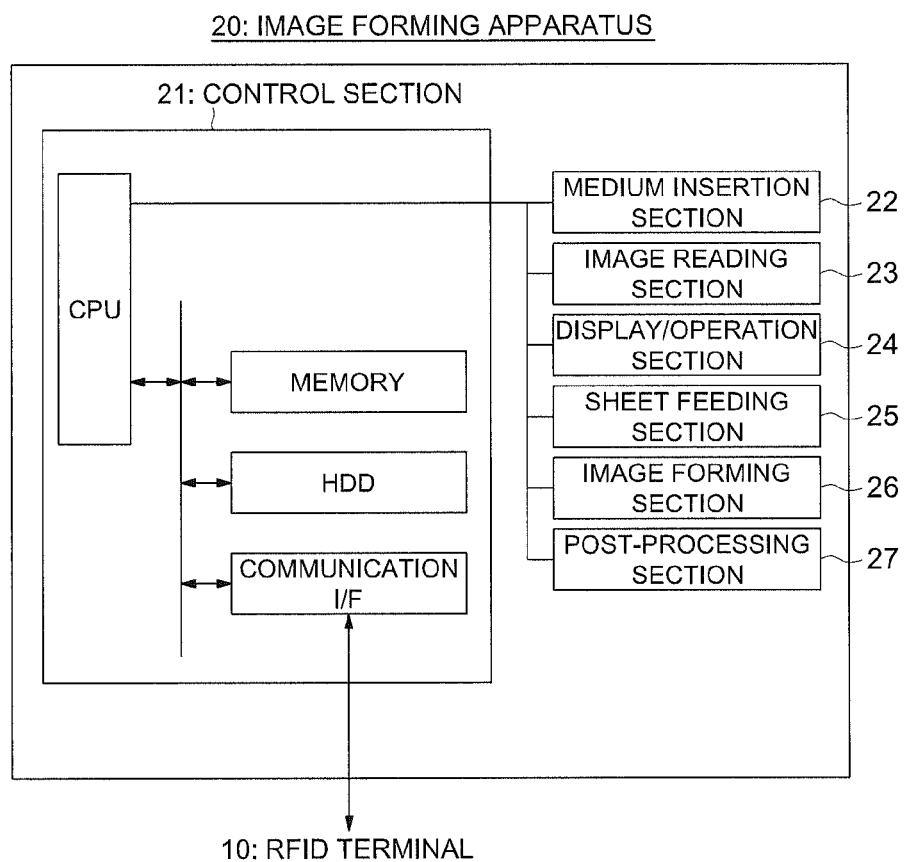
FIG. 6 is a block diagram showing a configuration of the image forming apparatus relating to an embodiment of the present invention.
Figures 7A, 7B:
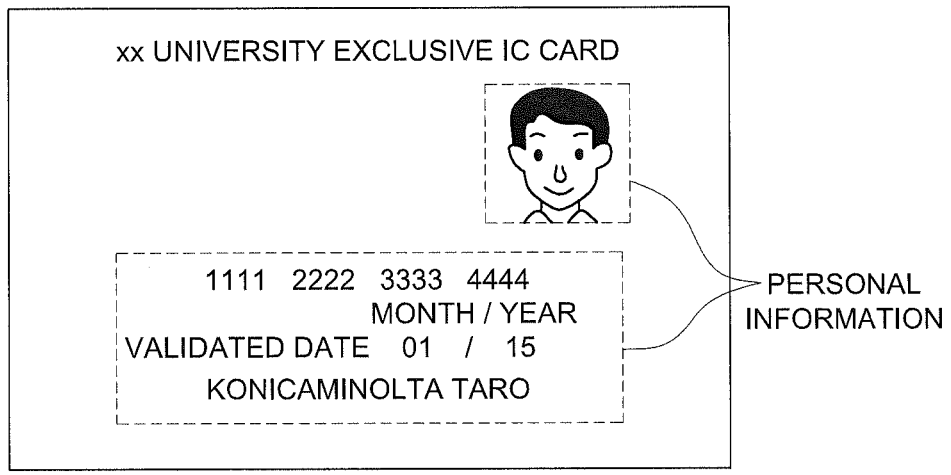
FIGS. 7a-7b are diagrams respectively showing an example of external view of an IC card, and an example of contents stored in the IC card.
Figure 8A:
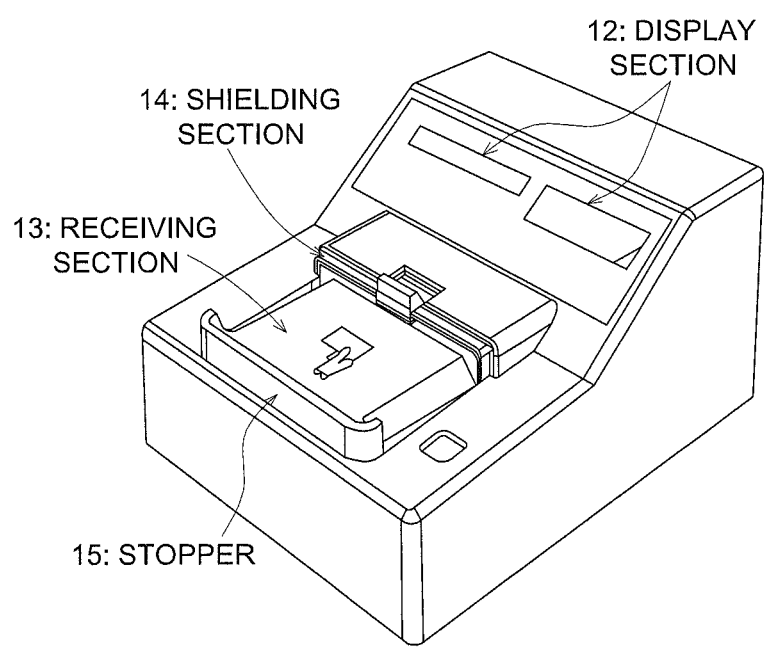
FIGS. 8a-8b are perspective views showing specific structures of the control device relating to an embodiment of the present invention.
Figure 8B:
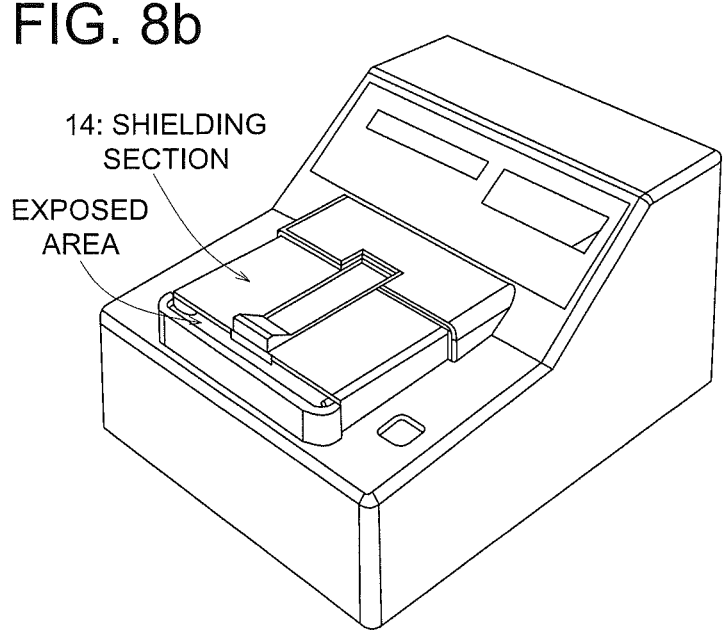
Figure 12A:
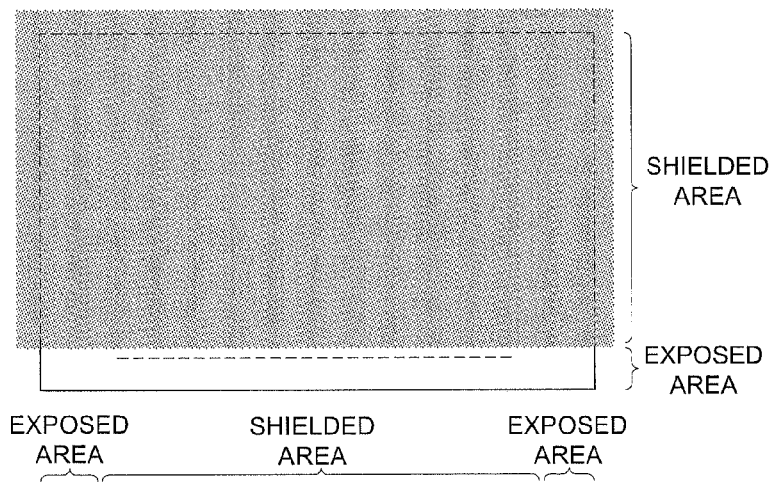
FIGS. 12a-12c is a diagram showing an example of shielded area of the IC card.
Figure 12B:
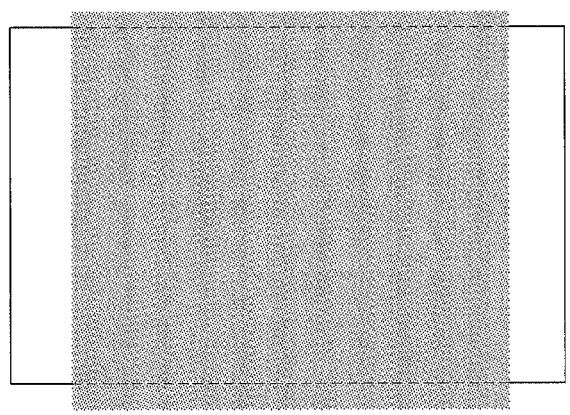
Figure 12C:
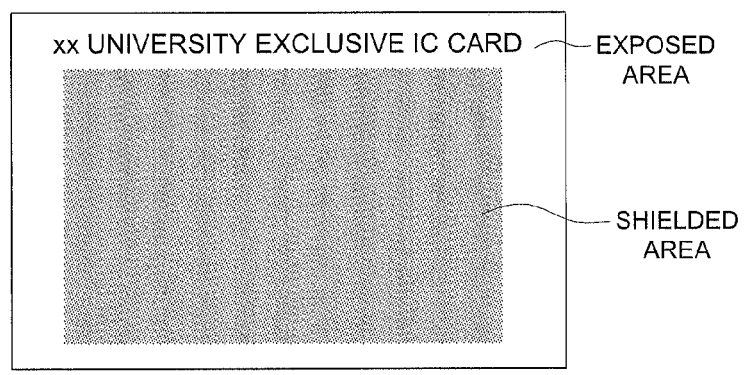
Figure 13:
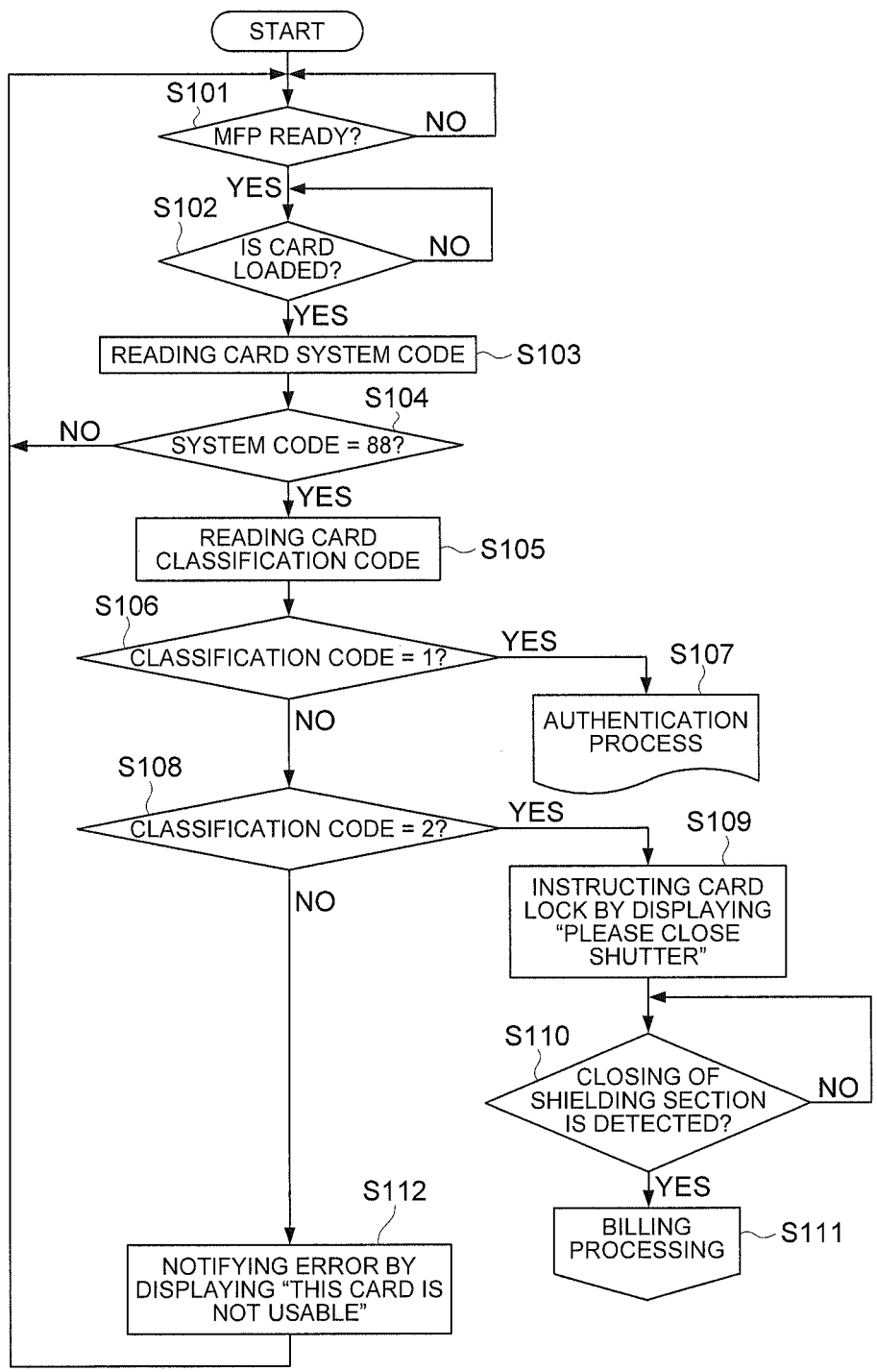
FIG. 13 is a flow chart showing an operation of the control device relating to an embodiment of the present invention.

In order to explain an embodiment of the present invention, the control device and the use control method for a control object apparatus will be described by the reference of FIGS. 1 to 13. FIG. 1 is a diagram showing a configuration of a RFID system relating to the embodiment. FIGS. 2-4 are diagram showing configurations of the control device. FIGS. 5 and 6 are diagrams showing an image forming apparatus. FIGS. 7a-7b are diagrams a configuration of the IC card, FIGS. 8a-11 are diagrams showing specific structures of the control device. FIGS. 12a-12c is a diagram showing a shielded area of the IC card, and FIG. 13 is a flow chart showing an operation of the control device relating to the embodiment.

As shown in FIG. 1, an RFID system of the present embodiment is configured with image forming apparatus 20 provided with copying function and printing function and the like, a control device to control the use of the image forming apparatus 20 (herein after referred as RFID terminal 10), and IC card 30 to be used in cases of using the image forming apparatus 20. Wherein, RFID terminal 10 and IC card 30 communicate with each other by the use of electromagnetic induction or electromagnetic coupling, and RFID terminal 10 communicates with image forming apparatus 20 by wired or wireless communication.

In the present embodiment, the case of using IC card 30 is described, however, any thing that can identify a user may be utilized, for example, such as a portable terminal {for example a mobile phone installed with FeliCa (registered mark)} may be used. Individual devices will be described below.

(RFID Terminal)

As shown in FIGS. 2 and 3, RFID terminal is provided with control section 11, display section 12, receiving section 13 shielding section 14, and stopper 15, and the like.

Control section 11 is provided with CPU (Central Processing Unit), memories such as ROM (Read Only Memory) and RAM (Random Access Memory), HDD (Hard Disk Drive), first communication I/F section, second communication I/F and the like, these being connected via a bus. CPU executes the control of each part. Memory temporarily stores various data read from HDD, first communication I/F, and second communication I/F, and the stored data is processed by the CPU. The HDD stores a program to be used by the CPU for controlling each part of the terminal, information regarding processing function of the device, data for authenticating the user, and the like. The stored data are read out by the UPU as necessary, and executed on the memory. The first communication I/F section establishes the connection with IC card 30 by the use of the electromagnetic induction or the electromagnetic coupling, and executes data transmitting and receiving. The second communication I/F section establishes the connection with image forming apparatus 20 connected with wire-line or wireless, and executes data transmitting and receiving.

Said control section 11, as shown in FIG. 4, functions as reading section 11a to read the information stored in IC card 30 by using the first communication I/F section; discriminating section 11b to discriminate user's attribute by comparing the read-in information with the information stored in the HDD and the like, and to switch operation modes in accordance with the user's attribute; and as billing processing section 11c to judge the status of shielding section 14, and if shielding section 14 is confirmed to be closed, to execute the processing of billing mode. Each of said reading section 11a, discriminating section 11b and billing processing section may be configured as hardware. While, control section 11 may be configured as a control program which allows RFID terminal to function as reading section 11a, discriminating section 11b and billing processing section 11c, and said control program may be operated on control section 11.

Display section 12 is configures with a liquid crystal display device (LCD) or an organic EL (electroluminescence) display device, and the like, and displays a status of RFID terminal 10, residual money amount in the card, use fee, error information, and the like.

Receiving section 13 is a part to accommodate IC card 30, a mark to indicate the position to set the IC card is provided on the surface of receiving section 30, the first communication I/F is provided inside, and the communication with the loaded IC card is enabled. Further, on the front surface, stopper 15 is provided to prevent taking out the loaded IC card.

Shielding section 14 is a section to restrict the attachment and removal of IC card 30 accommodated in receiving section 13, and is structured with including a material (such as a metal) to block off the electromagnetic wave. When the shielding section 14 is retracted into the main body with a slide mechanism, all the face of receiving section 13 is exposed, and when the shielding section 14 is extracted and contacted to stopper 15, a part of the receiving section 13 is exposed. Detailed structures of receiving section 13 and shielding section 14 will be described later.

(Image Forming Apparatus)

As shown in FIGS. 5 and 6, image forming apparatus 20 is configured with control section 20, medium insertion section 22, image reading section 23, display/operation section 24, sheet feeding section 25, image forming section 26, post-processing section 27, and the like.

Control section 21 is for controlling each component part and provided with a CPU, memories of ROM and RAM, a HDD, a communication I/F section, and the like which are connected via a bus. CPU executes the control of each part and image processing, and the like. The memory temporarily stores various data read from medium insertion section 22, image reading section 23, HDD and the like, and the stored data is subjected to image processing by the CPU, and transferred to image forming section 26. The HDD stores a program for CPU to control the each part, information regarding the processing functions of the apparatus, and the like. The stored information is read out by the CPU as necessary, and is executed on the memory. The communication I/F section establishes a connection with RFID terminal 10, and executes data transmission and reception.

Medium insertion section 22 is provided with a slot capable of inserting various types of media, and reads data of printing object and the like from the inserted medium.

Image reading section 23 optically reads the image data from an original document on the original platen, and is configured with a light source to scan the original document, a CCD (Charge Coupled Devices) image sensor to convert the reflected light into electric signals, an A/D converter to convert the image signals, and the like.

Display/operation section 24 is configured with a display section of a LCD display device or a organic EL display device, on which a pressure sensitive operation section (touch panel) of transparent electrode mesh array being arranged. And display/operation section 24 enables various screen display and various settings instructions for operating image forming section 20.

Sheet feeding section 25 configured with sheet trays to accommodate various sizes of sheets, sends out the accommodated sheet to image forming section 26.

Image forming section 26 is configured with structural elements necessary for image formation utilizing image forming process such as electrophotographic system or electrostatic recording system, including a photosensitive material, an intermediate transfer belt, fixing unit, various belts and the like. Image forming section 26 forms an image on a specified sheet based on the image data processed by control section 21, and sends out toward post-processing section 27.

Post-processing section 27 applies a finishing process required by a user such as punching, stapling, and book making on the sheet sent from image forming section 26, and outputs the sheet.

FIGS. 5 and 6 show an example of image forming apparatus 20 relating to the present invention, whose configuration is not specially restricted only if provided with a function of copying or printing.

(IC Card)

IC card 30 is a card having a built-in IC tag capable of communication with RFID terminal 10 by the use of electromagnetic induction or electromagnetic coupling, and IC card is used as a credit card or an identification card. As shown in FIG. 7a, on the surface of IC card 30, printed at prescribed positions are personal information such as a card number, name of an owner, a face photo. In the IC tag various types of information are recorded, in a case of a card to be used in school and the like, as shown in FIG. 7b, such as a system code (a code specified to each issuer company or association), a classification code (a code to discriminate a student, a clerk, or others), clerk/student ID number (identification number inherently allocated to a clerk or a student) a belonging code (identification sign for belonging division), a name (the name of the card owner), balance of electronic money (remaining amount of electronic money stored in the IC card), a latest date of use (information of date and time when the electronic money is used).

Next, structures of receiving section 13 and shielding section 14 of RFID terminal 10 will be described.

Figure 9A:
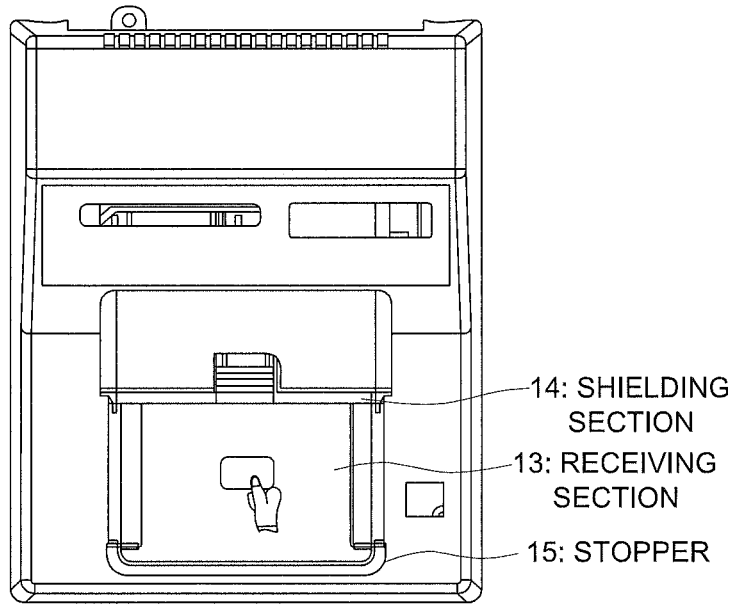
FIGS. 9a-9c are top views showing specific structures of the control device relating to an embodiment of the present invention.
Figure 9B:
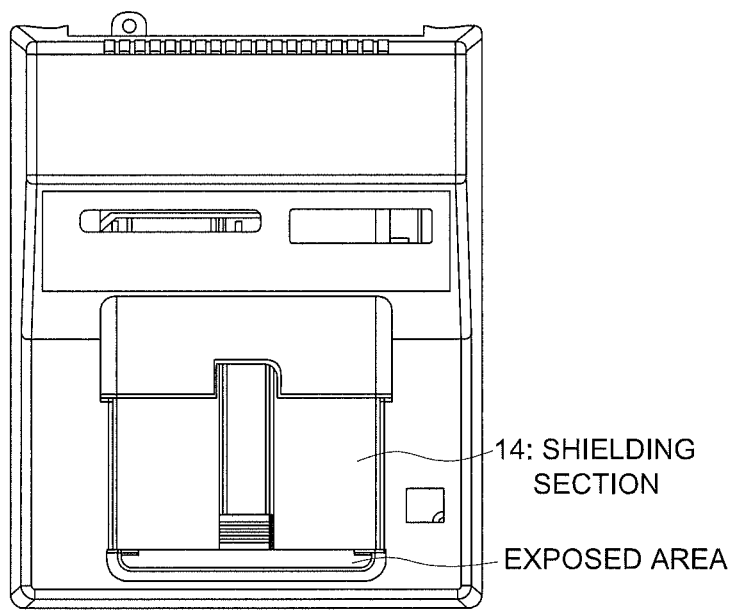
Figure 9C:
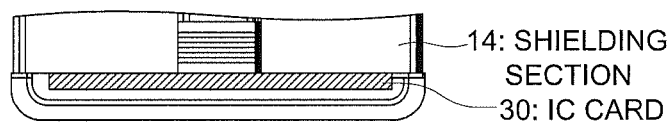

As shown in FIGS. 8a-8b, and FIGS. 9a-9c, receiving section 13 has a platen with larger sizes than IC card 30. At a front side of receiving section 13 (down-left direction in FIG. 8a, down direction in FIG. 9a), stopper 15 is provided to prevent a drawing out of IC card 30. The edge portion of stopper 15 is curved to a direction of encompassing the platen. Shielding section 14 is arranged to be slidable in a parallel plane with the platen, and when shielding section 14 is slid out, it hits to the curved portion of stopper 15 and a part of the platen becomes exposed. According to such the configuration, in a state that shielding section is closed, IC card placed on the platen cannot be drawn out, and in addition, a part of IC card can be seen through the exposed area near stopper 15, as shown in FIG. 9c.

Figure 10A:
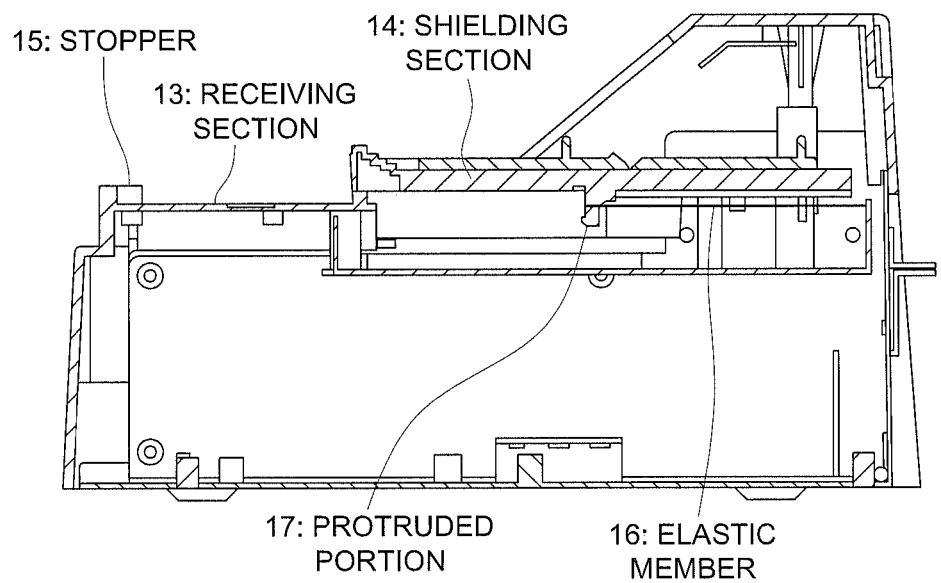
FIGS. 10a-10b are sectional side views showing internal structures of the control device relating to an embodiment of the present invention.
Figure 10B:
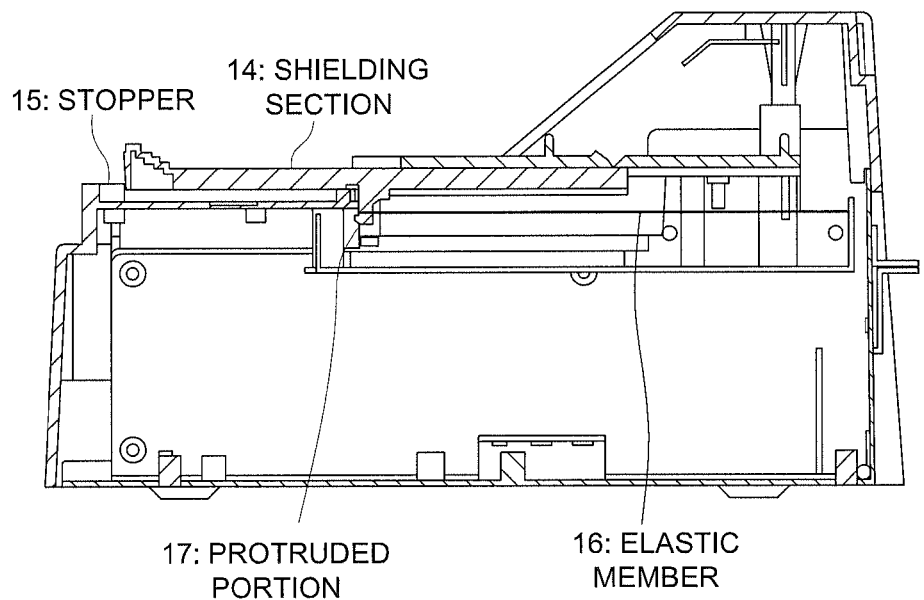

Further, as shown in FIGS. 10a-10b, on shielding section 14, provided is protruded portion 17 to hook a elastic member 16 such as gum or a spring, and by hooking one end of elastic member 14 to protruded portion 17 and fixing the other end portion to main body of RFID terminal, shielding section 14 slides to the direction of opening (right direction in FIG. 10a) in the normal state.

Figure 11:
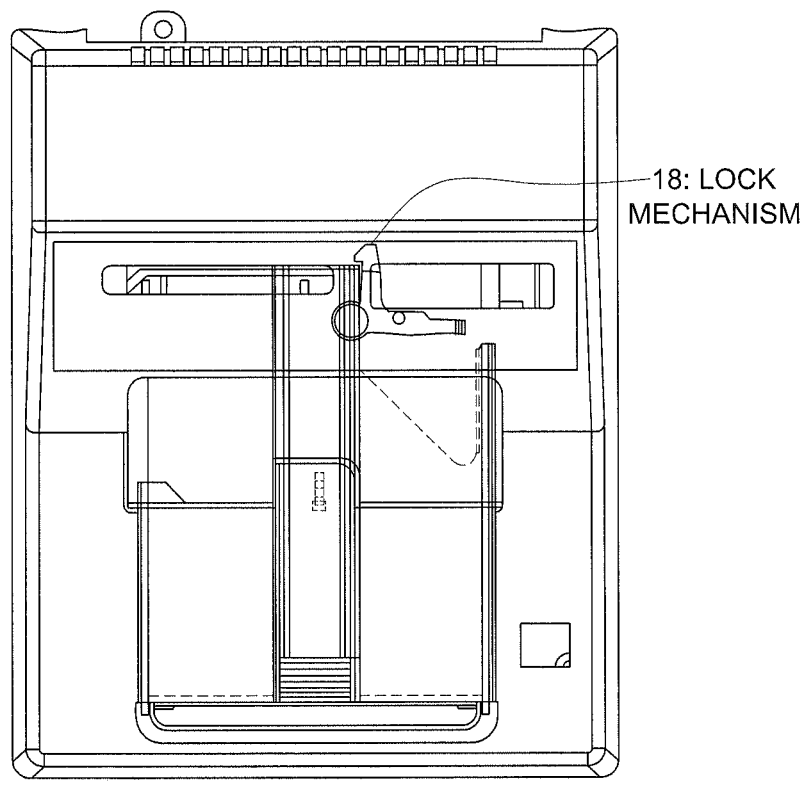
FIG. 11 is top a view showing internal structure of the control device relating to an embodiment of the present invention.

Further as shown in FIG. 11, provided are lock mechanism 18 which is driven by control section to keep shielding section 14 in closed state, and a detection section (not illustrated) to detect the closed state of shielding section 14 by photo sensor, electronic contact, or by mechanical contact. Then, when shielding section is drawn out forward to hit stopper 15, the detection section detects the closed state of shielding section 14, and sends a signal to control section 11. Then control section 11 drives lock mechanism 18 based on the signal from the detection section (by rotating lock mechanism 18 and striking its portion to the back end of shielding section 18, in FIG. 11) to keep shielding section 14 in closed state, and starts the billing processing. Then, after finishing the billing processing, control section drives lock mechanism to release the lock. In this way, by interlocking the control of lock mechanism and the billing processing, the drawing out of IC card 30 is prevented beforehand while the billing processing is surely executed.

Further, shielding section 14 is made of a metal to shield electromagnetic waves, or made of a material to pass electromagnetic waves (such as a plastic or a glass) provided with a metal layer or a lattice like metal wiring on the front and or back face of the material. With this structure, the cheating to make RFID terminal 10 recognize that a legitimate IC card is installed by installing a false IC card on receiving section 13 and by holding the IC card over from outside the shielding section 14 can be prevented beforehand.

Further, shielding section 14 is made of an opaque material to prevent viewing personal information described on IC card 30 through shielding section 14. Regarding the protection of personal information, in the present embodiment, as shown in FIG. 12a, the portion other than the end portion of stopper 15 side of IC card 30 is shielded. However, as shown in FIG. 12b, the configuration where end portions of opposing left/right sides of IC card 30 is made visible can be also applicable. In this case, the shielding area of the shielding section 14 may be made of a material with high visible light blocking property (such as a metal, colored plastic, or colored glass), and the exposed area of the shielding section 14 may be made of a material with high visible light transparency (such as a transparent plastic or glass). Further a configuration may be also applicable where shielding section is made in a shape of only cover the shielding area of FIG. 12b, and stoppers are provided outside the right/left two sides of the platen. Further, in a case where printed positions of personal information are previously specified, only the portion of personal information may be shielded as shown in FIG. 12c. In this case, the shielding area of the shielding section 14 may be made of a material with high visible light blocking property and the exposed area may be made of a material with high visible light transparency.

FIGS. 8a-12c are shown as examples of the embodiment, and receiving section 13 and shielding section 14 can be changeable in structure, shape, and material provided that drawing out of IC card is prevented, loading of IC card can be confirmed by viewing, while personal information is kept secret, in the state where IC card is installed in receiving section 13 and shielding section 14 is closed. For example, although in FIGS. 8a-11, shielding section 14 is configured as slide structure, the other structure may be applicable where shielding section open/closes with an axis of a hinge, or a structure where shielding section 14 turns in a plane parallel to the platen of receiving section 13.

Next, the operation of above-configured RFID terminal 10 will be described referring to a flow chart of FIG. 13.

In the first place, in step S101, control section 11 of RFID terminal 10 communicates with image forming apparatus by using a second communication I/F section to confirm whether image forming apparatus 20 is in a workable state.

In a case where image forming apparatus 20 is workable, in step S102 control section 11 judges whether IC card 30 is loaded in receiving section 13 (whether communication with IC card 30 is possible via a first communication I/F section), and if judged is that IC card 30 is installed, reading section 11a reads information stored in an IC tag of IC card 30 (in this embodiment, system code shown in FIG. 7b) in step S 103.

Next, in step S104, discriminating section 11b judges whether the read system code is a previously determined specific value (in the present embodiment, "88") or not, and if not the specific value, discriminates that the IC card is not an IC card of usable object of the RFID system of the present embodiment, and the process returns to step S101. On the other hand, if the read system cord is the specific value, in step S105, reading section 11a reads other information stored in IC card 30 (in the present embodiment, a classification code in FIG. 7b).

Next, in step S106, discriminating section 11b judges whether the read classification code is a first value (in the present embodiment, the first value=1) and if, it is the first value, discriminating section 11b judges that the owner of the IC card is a user who is not required of billing processing (in the present embodiment, the owner is a clerk), and authentication mode will be executed in step S107.

For example, in a case where the information shown in FIG. 7b is recorded in IC card 30, the clerk/student ID number is compared with previously registered clerk information in HDD and the like, and if the owner is confirmed as a registered clerk, the authentication is judged to OK (success) and use of image forming apparatus 20 is permitted, and if not confirmed as a registered clerk, the authentication is judged to NG (failure) and use of image forming apparatus 20 is prohibited, or a message is displayed on display section 12 to indicate that the owner of IC card 30 is not registered. Meanwhile, since the billing is not required in the authentication mode, it is preferable not to display the electronic money balance or the use fee on display section 12 in the case of using image forming apparatus 20.

On the other hand in a case where the read classification code is not the first value, discriminating section 11b judges whether the classification code is a second value (in the present embodiment, the second value=2) in step S108, and if it is the second value, discriminating section 11b judges that the owner of the IC card is a user who is required of billing processing (in the present embodiment, the owner is a student), and billing mode will be executed. In the billing mode, since there is a possibility of a cheating such that IC card 30 is took out before billing processing control section displays a message on display section 12 to urge an operation of shielding section 14 (for example, "please close shutter") in step S109, and judges whether shielding section 14 is closed by receiving a signal from the detecting section. If control section judged the closing state of shielding section 14, executes the processing of billing mode in step S111.

For example, in a case where the user executes copying or printing by operating display/operation section 24 after setting an original document on image reading section 23 of image forming apparatus 20 or inserting a medium into medium insertion section 22, control section 21 sends information regarding the copying or printing (number of sheet for copying or printing, type of the sheet, size of the sheet, color/black and white, and the like) to RFID terminal 10. Then control section 11 of RFID terminal 10 calculates a billing amount based on the information regarding the copying or printing, displays the balance of electronic money and the billing amount, and collects electronic money of the billing amount from IC card 30. Upon completion of the billing processing, control section 11 releases the lock of shielding section 14, displays on display section 12 to urge picking up IC card 30, or causes attention by blinking a lamp.

In this way, in the case of billing mode, since the copying or printing becomes executable with image forming apparatus 20 only after card lock (the state where shielding section 14 is kept closed) is confirmed, the billing is surely conducted.

On the other hand, in a case where the read classification code is not the first value or the second value, in step S112 control section 11 notifies an error to the user by displaying error information (for example, "This card is not usable.") on display section 12.

As described above, according to the present embodiment, necessity of the billing processing is judged based on the information previously recorded in IC card 30, and if the billing is not required, the use of image forming apparatus 20 is enabled only by putting IC card 30 on the platen of shielding section in the authentication mode, and if the billing is required, the use of image forming apparatus 20 is enabled after confirming that shielding section 14 is kept in closed state in the billing mode, therefore, the billing processing is surely executed from the student while convenience for the clerk is not spoiled. Further, since shielding section 14 is made with an electromagnetic wave shielding material or structure, a wrongful use of image forming apparatus 20 by a disguising operation can be prevented beforehand. Further, since shielding section 14 keeps secret of personal information described on IC card 30 in the closed state, while a part of IC card 30 is made visible, leaving behind IC card 30 can be prevented with keeping the security.

In the above embodiment, as the control object apparatus, image forming apparatus 20 is exemplified for explanation, however, the present invention is not restricted to the above-described embodiment, and can be applied to arbitrary apparatuses in which use forms can be discriminated according to user's attributes, such as apparatuses in a traffic system, for example, a ticket-vending machine, and a ticket gate. Further, the control device (or control section) in the above-described embodiment may be configured as a management apparatus provided with a billing processing function and a user authentication processing function.

(Effect of the Invention)

According to the control device and the use control method for an object apparatus of the present invention, both the processing of authentication and billing can be properly executed.

The reason is that the control section of the control device discriminates the user's attributes based on the information read from the IC card, changes operation mode in accordance with the user's attribute, thus the authentication and the billing are separately executed.

According to the control device and the use control method for an object apparatus of the present invention, the billing processing is surely executed, as well as the leakage of personal information and leaving behind the IC card being prevented.

The reason is that in the billing mode, the receiving section of the IC card is covered by the electromagnetic wave shielding section, and after confirming that the IC card is kept impossible to be took out, the use of control object apparatus is enabled, while in a closed state of the shielding section, a part of the IC card excluding the area of personal information description is made visible.

According to the present invention, in cases of providing copying or printing service by utilizing an image forming apparatus installed in facilities such as a school, a library or a town office, convenience of both the working staff users of the facility and users of the facility are improved with a single apparatus.

The present invention is applicable to a control device for controlling the use of arbitrary apparatus and a use control method of the control device for control object apparatus.

What is claimed is:

1. A control device having a control section for controlling a use of control object apparatus, the control section comprising:
    a reading section which is configured to read out information including attribute information of a user recorded in an IC card with noncontact state;
    a discriminating section configured to discriminate an attribute of a user based on readout information and previously stored information, and configured to determine, according to the attribute of the user, either one of an authentication mode where use of the control object apparatus is permitted only by an authentication while billing is not required after the use of the control object apparatus, or a billing mode where a billing processing is executed in accordance with a use state of the control object apparatus; and,
    a billing processing section configured to execute the billing processing on the IC card,
    wherein the control section switches processing mode of the control object apparatus between the authentication mode and the billing mode based on the determination of discrimination section.

2. The control device of claim 1, further comprising a shielding section which is movable between a release position where taking out of the IC card is capable, and a lock position where taking out the IC card is restricted,
    wherein, in the billing mode, the control section permits the use of the control object apparatus after confirming that the shielding section has moved to the lock position.

3. The control device of claim 2, wherein the shielding section is configured such that an edge portion of the IC card is visible when the shielding section is at the lock position.

4. The control device of claim 1, further comprising a display section, wherein the control section changes information to be displayed on the display section in accordance with the authentication mode or the billing mode.

5. The control device of claim 4, wherein in cases where the information read out from the IC card and the previously stored information are not in agreement with each other, the control section displays error information on the display section, and prohibits the use of the control object apparatus.

6. A use control method for a control object apparatus in a system including at least the control object apparatus and a control device to control a use of the control object apparatus, the use control method comprising:
    reading out information recorded in an IC card with noncontact state; and
    discriminating an attribute of a user based on the readout information including attribute information of a user and previously stored information, and determining, based on the discriminated attribute of the user, an authentication mode where use of the control object apparatus is permitted only by an authentication while billing is not required after the use of the control object apparatus, and a billing mode where a billing processing is executed in accordance with a use state of the control object apparatus;
    permitting, in case of the authentication mode, the usage of the control object apparatus only by an authentication without requiring a billing processing after the use of the control object apparatus; and
    executing, in case of the billing mode, a billing processing on the IC card in accordance with a use state of the control object apparatus.

7. The use control method of claim 6, wherein the control device comprises a shielding section which is movable between a release position where taking out of the IC card is capable, and a lock position where taking out the IC card is restricted,
    wherein, the billing mode further includes a step of permitting the use of the control object apparatus after confirming that the shielding section has moved to the lock position.

8. The use control method of claim 7, wherein the shielding section is configured such that an edge portion of the IC card is visible when the shielding section is at the lock position.

9. The use control method of claim 6, wherein the control device comprises a display section, wherein the second step further includes a step of changing information to be displayed on the display section in accordance with the authentication mode or the billing mode.

10. The use control method of claim 9, wherein the second step further includes steps of displaying error information on the display section, and prohibiting the use of the control object apparatus, in cases where the information read out from the IC card and the previously stored information are not in agreement with each other.

* * * * *